E. A. COOPER.
Nut-Locks.
No. 144,511.  Patented Nov. 11, 1873.
Fig. I.
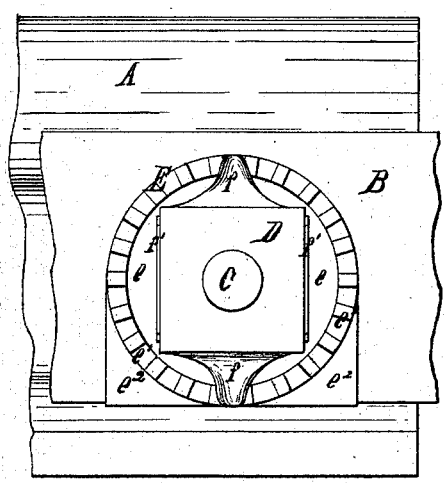
Fig. II.
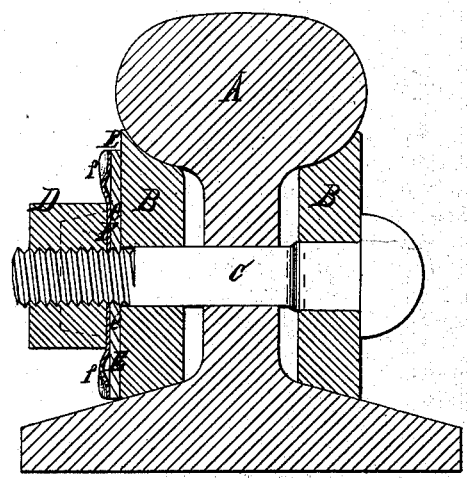
Fig. III.
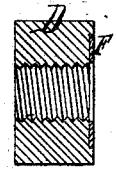
Fig. V.
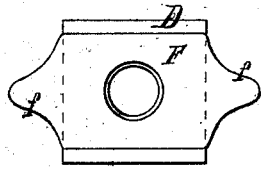
Fig. IV.
Fig. VI.
John J. Bonner
Chas. E. Mason
Witnesses.
Edward A. Cooper Inventor.
by Jay Hyatt
Atty.

UNITED STATES PATENT OFFICE.

EDWARD A. COOPER, OF LANCASTER, NEW YORK.

IMPROVEMENT IN NUT-LOCKS.

Specification forming part of Letters Patent No. 144,511, dated November 11, 1873; application filed July 30, 1873.

*To all whom it may concern:*

Be it known that I, EDWARD A. COOPER, of Lancaster, in the county of Erie and State of New York, have invented certain Improvements in Nut-Locks, of which the following is a specification:

My invention consists in the combination, with the nut to be held from turning, of a flat plate or disk, provided with a circle of teeth or corrugations outside of or beyond the circle described by the nut as it is rotated, and a spring-pawl secured to the nut so as to be held against turning relatively thereto, with its outer elastic or yielding end projecting beyond the edges of the nut, so as to engage with the teeth or corrugations of the plate, so as to permit the end of the pawl or detent to spring outward and ride over the corrugations as the nut is rotated, until the latter is screwed tightly against the central plane portion of the corrugated plate, when the resistance between the pawl and the corrugation with which it is engaged is sufficient to prevent the nut from accidentally unscrewing, or until a greater force is applied, sufficient to overcome this resistance of the spring-pawl, as in applying a wrench thereto.

In the accompanying drawing, Figure 1 is a side elevation of a portion of a fish-joint of a railroad-rail provided with my improved nut-lock. Fig. 2 is a cross-section thereof; Figs. 3 and 4, cross-sectional views of the nut and pawl, showing modifications of the manner of securing the two against relative rotation. Fig. 5 is a plan of Figs. 3 and 4, and Fig. 6 is an edge view of the corrugated plate.

Like letters of reference designate like parts in each of the figures.

A is a portion of a railroad-rail; B B, the plates of the fish-joint; C, the bolt for securing these plates together, and D the nut thereof. E is a flat plate, made of cast-iron or sheet metal, applied to the fish-plate, with a central hole for the passage of the bolt. $e$ is the plane central portion of this plate, surrounding the hole, and forming a flat bearing for the nut to press against; and $e^1$ is the row or circle of teeth or corrugations at the outer edge thereof. This plate, as represented in the drawing, is prevented from turning by the straight edge $e^2$ thereof, which rests against the base flange of the rail. When applied to a wooden surface, this plate may be held in place by spurs or lugs cast or formed therewith, which are forced into the wood; or the plate may be secured in any other suitable or known way. F is the spring-pawl, which is shown in the drawings as made of a plate of thin sheet metal, provided with a central hole for the passage of the bolt, and with two projecting arms, $f$, the ends of which are made with a curved or V-shaped radial depression, so as to form on the under side a tooth suitable for engaging in the teeth or corrugations $e^1$, and ride over the same when the nut is turned in either direction. In Fig. 1 this pawl-plate is shown secured to the nut by flanges $f^1$, turned outward so as to overlap the edges of the nut on two opposite sides thereof. In Fig. 3 this plate is shown as fitting in a depression or countersink formed in the inner face of the nut, while in Fig. 4 the plate is represented as fixed to the nut by narrow flanges $f^2$ fitting in grooves in the nut.

The pawl-plate may be held against relative turning with the nut by any of these means; or it may be made with only one projecting spring-arm, or with three or more, as desired.

What I claim, and desire to secure by Letters Patent, is—

The combination, with the bolt and nut, of the plate E, provided with radial corrugations $e^1$, and the spring-plate F, provided with pawl $f$, constructed to ride over the corrugations $e^1$ in either direction, as herein shown and described.

EDWARD A. COOPER.

Witnesses:
JOHN J. BONNER,
CHAS. E. MASON.